United States Patent [19]
Brown

[11] Patent Number: 5,199,379
[45] Date of Patent: Apr. 6, 1993

[54] BREEDING BOX CONSTRUCTION AND METHOD FOR TEMPORIZING MALE AGGRESSION

[76] Inventor: James D. Brown, 1183 4th St., Napa, Calif. 94558

[21] Appl. No.: 758,794

[22] Filed: Sep. 12, 1991

Related U.S. Application Data

[63] Continuation-in-part of Ser. No. 568,178, Aug. 16, 1990, Pat. No. 5,078,095.

[51] Int. Cl.⁵ ............................................. A01K 31/07
[52] U.S. Cl. ....................................................... 119/17
[58] Field of Search ................... 119/17, 21; 403/267, 403/278, 341

[56] References Cited

U.S. PATENT DOCUMENTS

| | | | |
|---|---|---|---|
| 1,420,880 | 6/1922 | Stakutis | 119/17 |
| 2,725,851 | 12/1955 | Futterer | 119/17 |
| 2,822,780 | 2/1958 | Buell | 119/17 |
| 4,048,059 | 9/1977 | Evans | 403/230 X |
| 4,844,647 | 7/1989 | Schulz | 403/341 X |

Primary Examiner—Robert P. Swiatek
Attorney, Agent, or Firm—Harold D. Messner

[57] ABSTRACT

The present invention relates to a breeding box that temporizes aggression of strong beaked exotic birds. In one aspect, the assembled box comprises (i) a central section having a pair of arms defining non-parallel axes of symmetry and a nesting arm extending from the pair of arms. The pair of arms in association with the nesting arm define a junction point between them. Each of the pair of arms also includes a normally open external passageway to permit external entry and egress of birds relative to the central section. The assembled box also includes (ii) a baffle positioned adjacent to the junction point of the arms. The baffle is in attaching contact with the central section whereby direct passage between the pair of arms bypassing the nesting arm is prevented, and wherein a sitting female within the nesting arm is provided with an escape option whereby male aggression can be temporized without disruption of the breeding cycle. Note that the passageway defined within the pair of arms is adjacent to anteroom regions connected to a flight cage; that the nesting arm provides the nest for the female; and that the purpose of the baffle is to limit direct passage of the male from one of the pair of arms to the other (bypassing the nesting arm), as when the female is escaping from the nest. A method of assembly is also described.

17 Claims, 6 Drawing Sheets

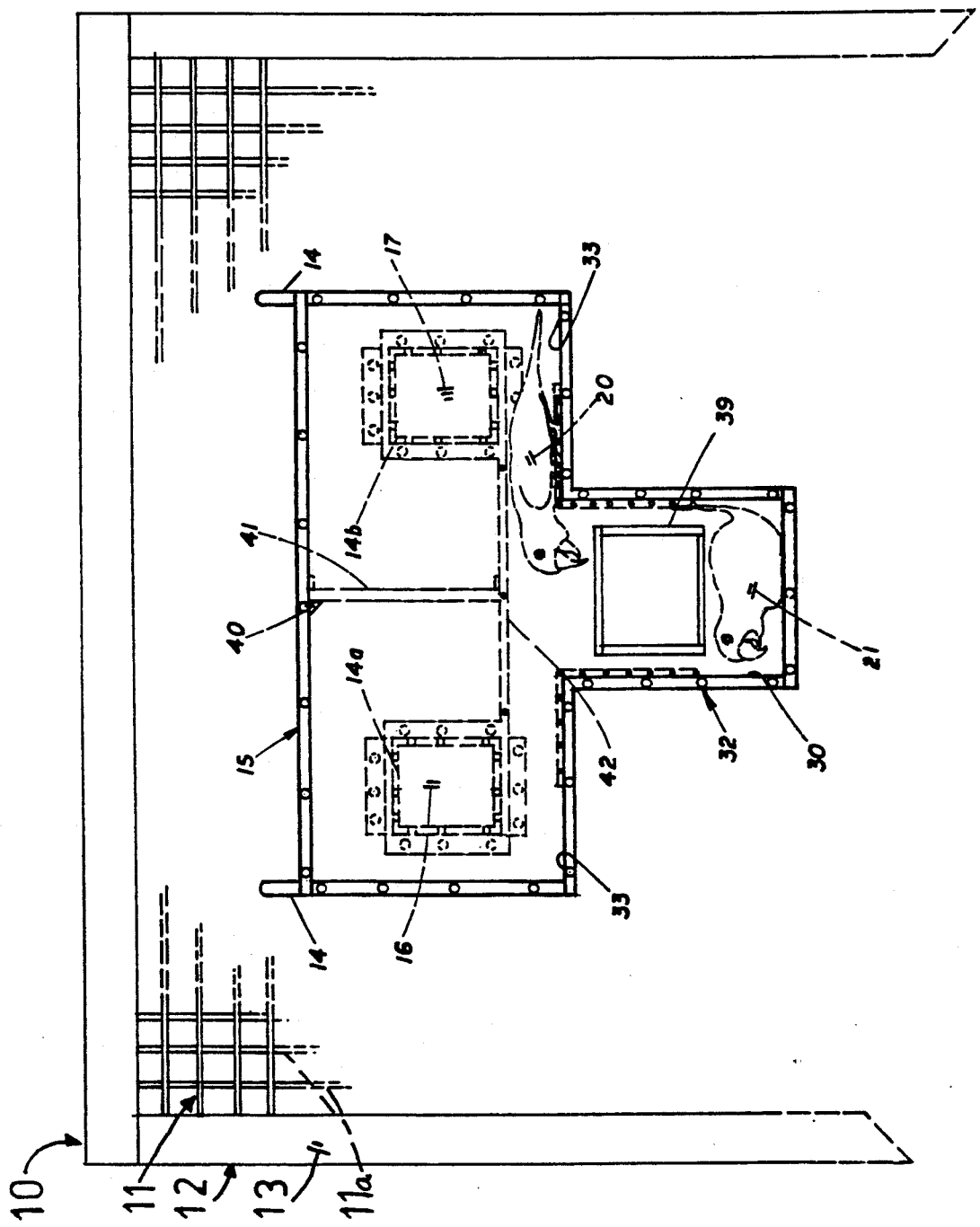

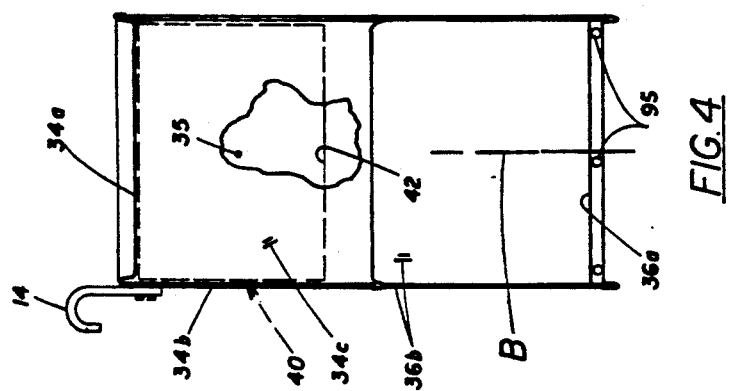
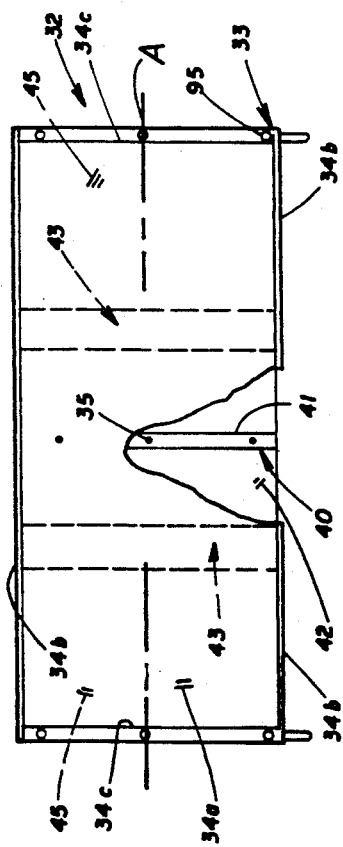
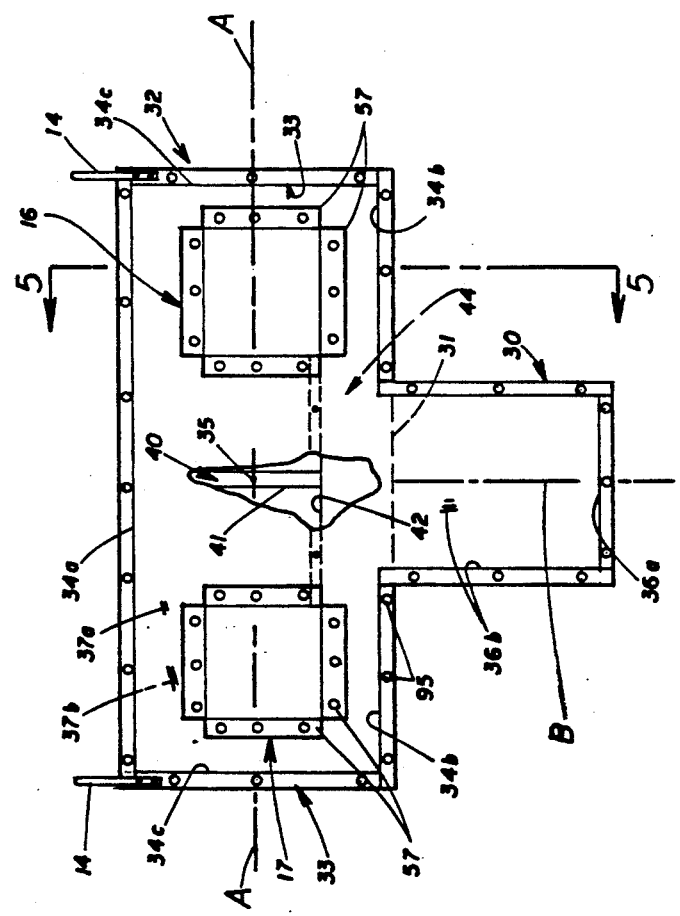

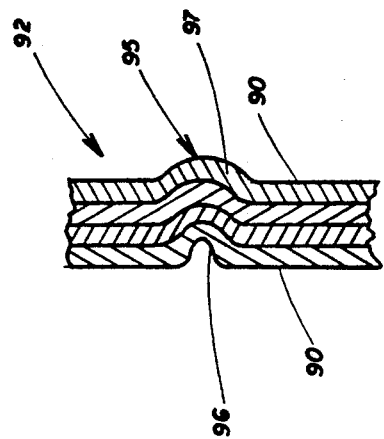
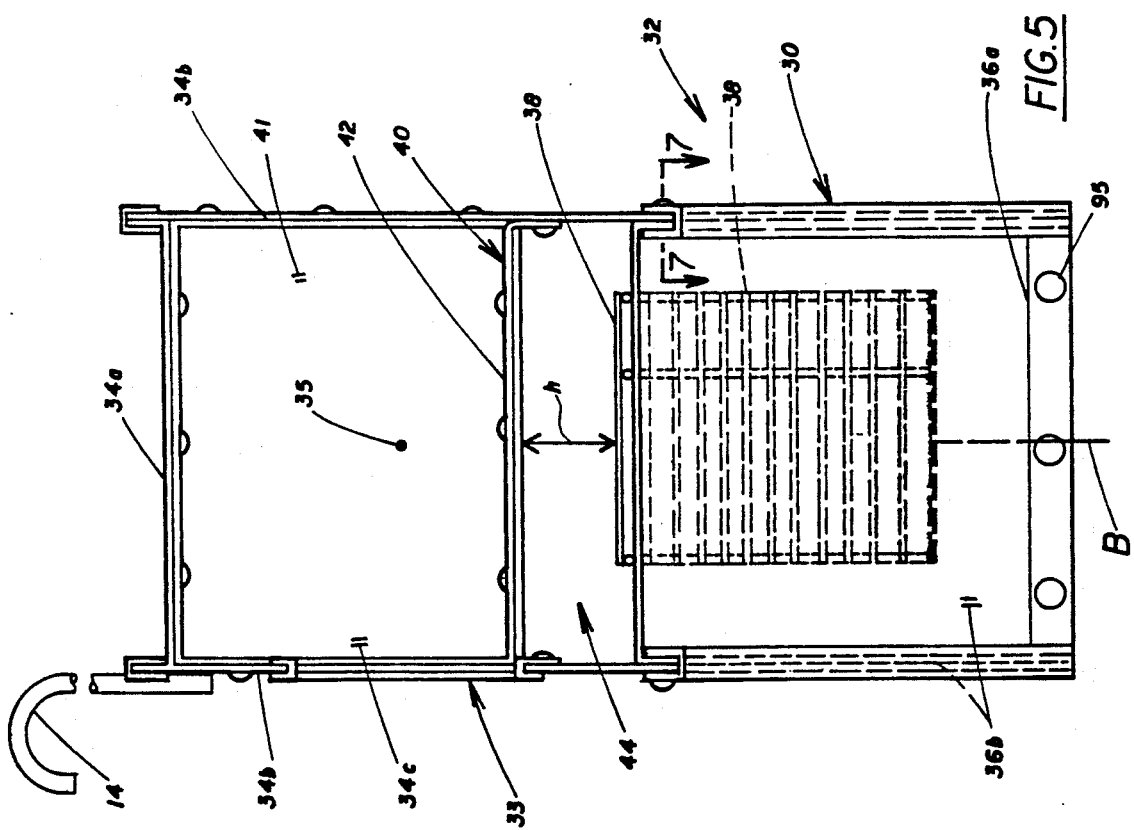

BREEDING BOX CONSTRUCTION AND METHOD FOR TEMPORIZING MALE AGGRESSION

RELATED APPLICATION TO THE INVENTION

This application is a continuation-in-part of my Ser. No. 568,178 for "BREEDING BOX FOR TEMPORIZING MALE AGGRESSION", filed Aug. 16, 1990 now U.S. Pat. No. 5,078,095.

SCOPE OF THE INVENTION

This invention relates to breeding boxes for exotic, strong beaked birds such as cockatoos and the like in which aggression of males of such species is temporized, and more particularly to an improved breeding box construction and method including means permitting elements comprising the boxes to be stacked together and then to be shipped for assembly off-site whereby shipping cost per unit is minimum.

BACKGROUND OF THE INVENTION

Importation of exotic birds in the United States has now been limited by law as well as by circumstances associated with destruction of the tropical forests of the world. Hence, many importers are turning to domestic breeders to maintain an adequate supply. However, in attempting to create a domestic breeding environment, especially one related to more expensive rare birds such as cockatoos, many breeders have found that their efforts are uneconomic. Often, expenses escalate because of several factors, inter alia, (i) the need for human supervision of the breeding boxes and (ii) the requirement of shipping fully assembled breeding boxes to distributors because of complexity of construction wherein bulk (not weight) unduly increases costs per unit.

Also, it has been found that the males of the specie are difficult to control during the breeding cycle. They have very strong beaks and are often very aggressive during the breeding season. The mating behavior of males is dominant and he will often attempt to corner the female in the breeding box and attack her with his strong beak to force copulation. If not then separated from the female, the male can so disrupt the breeding cycle that the female is kept from incubating, turning and ultimately hatching the eggs. Hence, there is a need to provide a temporizing breeding environment for strong beaked exotic birds, viz., cockatoos, that permits the female to nest but nevertheless, during the male's fits of aggression (usually of short duration) allows her the opportunity to escape the nesting region unhurt. She can later return to her eggs after the male's aggression subsides.

SUMMARY OF THE INVENTION

The present invention relates to a breeding box construction and method that temporizes aggression of strong beaked exotic birds. In one aspect, the assembled box comprises (i) a central section having a pair of arms defining non-parallel axes of symmetry and a nesting arm extending from the former. The pair of arms in association with the nesting arm define a junction point between them. Each of the pair of arms also includes a normally open passageway to permit external entry and egress of birds relative to the central section. The assembled box also includes (ii) a baffle positioned adjacent to the junction point of the arms. The baffle is in attaching contact with the central section whereby direct passage between the pair of arms bypassing the nesting arm is prevented, and wherein a sitting female within the nesting arm is provided with an escape option whereby male aggression can be temporized without disruption of the breeding cycle.

Note that the passageways defined within the pair of arms are adjacent to a pair of anteroom regions in which each is connected to a flight cage; that the nesting arm provides the nest for the female; and that the purpose of the baffle (preferably of an inverted shape) is to limit direct passage of the male from one of the pair of arms to the other (bypassing the nesting arm), as when the female is escaping from the nest.

It does this by the fact that (i) the vertical segment of the baffle forms a solid wall between the pair of arms, while (ii) the transverse segment limits passage height to a value h, a value that only permits a bird to crawl down into the nesting arm with head exposed via a ladder attached adjacent to the nesting arm. In addition, the transverse segment is long enough to overhang the floors of the pairs of arms in the vicinity of the anterooms to provide a crawl space that limits the speed that the male can traverse the same. In another aspect, the breeding box is constructed of sheet metal and designed to have unitary panels of complementary mating shapes wherein all mating panels comprising each box are either straight edged (male) at their termini or are edged folded (female) in a L- or U-shape. Thus, the term "complementary" also describes the positional relationship of the mated male and female unitary panels, viz., at 90 degrees to each other after assembly. Such complementary design further permits assembly off-site wherein the male and female unitary panels can be to stacked in separate subassemblies, shipped and then assembled at the off-site location. In addition, a series of vee-shaped stays used in conjunction with the touching male and female panels further stabilizes attachment, as described below.

In detail, the method of the invention includes the steps of:

(1) prior to packaging, shipment and assembly at the off-site location, the fabricator sorts and packages the designed unitary female edged panels, male edged panels and clamping stays, into separate, stacked subassemblies wherein the bulk of the total package to be shipped is minimum;

(2) such packaged subassemblies are then shipped to the off-site location, for assembly;

(4) at the off-set location, the receiver unbuttons the subassemblies and then assembles the male and female panels as well as the vee-shaped clamping stays into a series of breeding boxes.

In regard to step (4), the design and shape of the unitary female edged panels, the unitary male edged panels and the vee-shaped clamping stays aid greatly the assembly of the breeding boxes at the off-site location, as follows:

(i) after unbutting the subassemblies of male panels, female panels and vee-shaped clamping stays, the receiver complementarily manipulates selected female and male panels into attaching positions in which the female and male panels mechanically touch;

(ii) then the receiver slides one of the clamping stays about the touching female and male panels ala a sandwich, and finally, deforms the touching region of the female and male panels and clamping stay using a hand-held tool, such as a hand-held crimping pliers whereby a permanent bonding occurs therebetween.

In a preferred assembly method, the receiver starts with a straight edged male panel forming a Tee- or Y-shaped side wall of the final breeding box; then he manipulates complementarily positioned female edged panels at right angles to the male panel. The female panel can be a top, bottom or side wall of the section, for example. Then the clamping stay is attached, and deformation along the mating surfaces occurs. Thereafter, the steps are repeated using adjacent straight edges of the Tee- or Y-shaped side wall with other complementarily positioned female panels so as to build the breeding box of the invention in sequential, progressive fashion.

However, before closure of each box occurs, the interior baffle as previously described, is attached at the interior of the construction, viz., at the junction point of the semi-formed pair of arms and the nesting arm.

In this aspect of the method, the receiver must insert the baffle at the interior of the major portion of the central section coincident with the junction point, and then permanently attaches the same to the central section before the central section becomes a completely closed structure. Attachment is preferably by way of sheet metal screws extending through openings in the contacting surfaces.

DESCRIPTION OF THE DRAWINGS

FIG. 1 is a rear elevational view of a conventional flight cage showing a pair of strong beaked cockatoos (in phantom line) within the breeding box of the present invention, the breeding box including a Tee-shaped central section mounted to the flight cage and enterable via a pair of openings also shown in phantom line;

FIG. 2 is a detailed front elevational view of the breeding box of FIG. 1 showing the openings of the Tee-shaped central section by which the cockatoos gain entry from the flight cage in more detail, FIG. 2 also being partially cut-away to illustrate a Tee-shaped baffle that prevents direct passage of the birds from parallel arm to parallel arm of the Tee-shaped section;

FIGS. 3 and 4 are top and side elevational views, respectively, of the breeding box of FIG. 2;

FIG. 5 is a section taken along line 5—5 of FIG. 2;

FIG. 7 is a section taken along line 7—7 of FIG. 5;

DETAILED DESCRIPTION OF A PREFERRED EMBODIMENT

Figure 6:
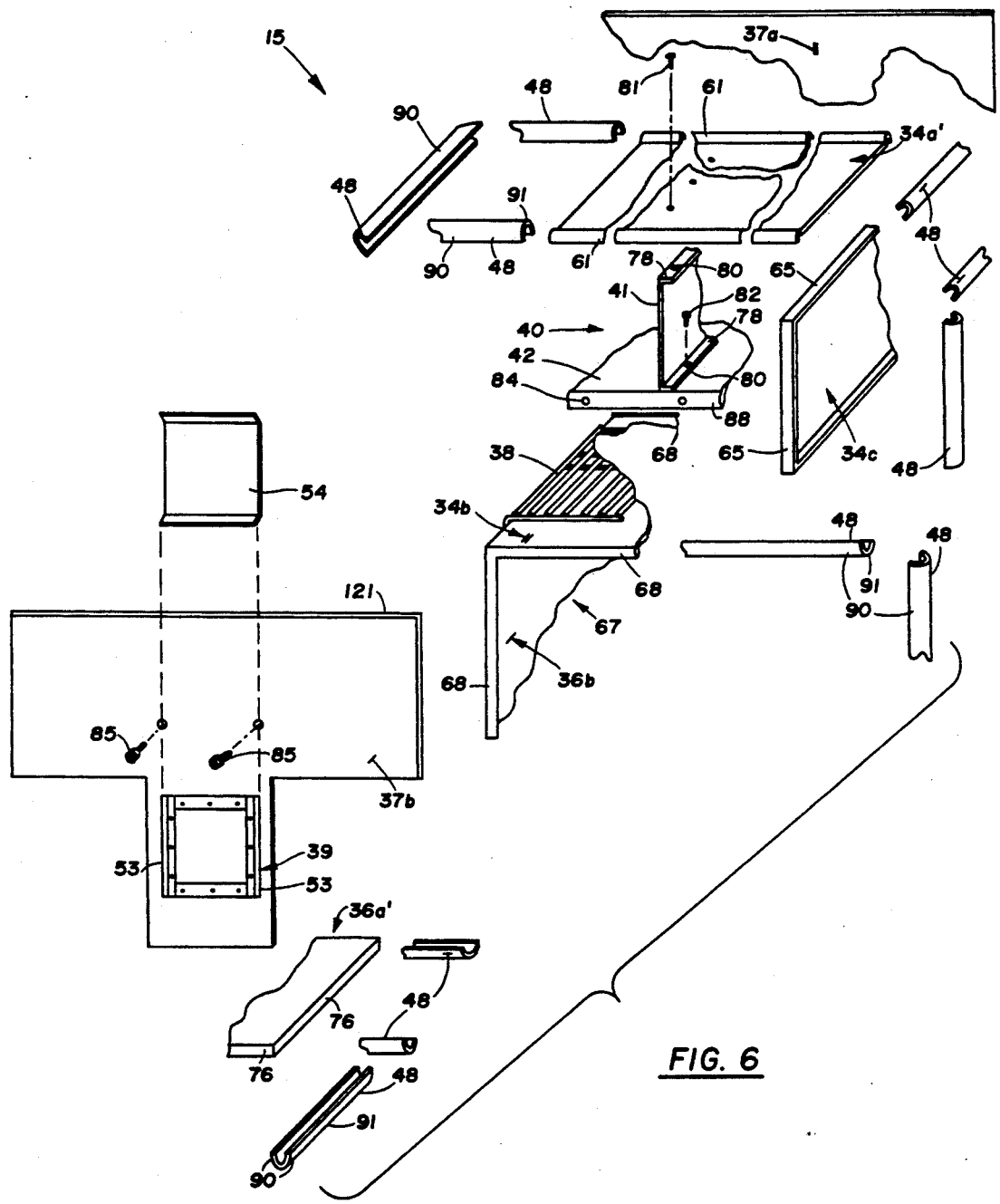
FIG. 6 is an exploded perspective view of breeding box of FIGS. 1-4 showing the method of assembly.

FIG. 1 shows a conventional flight cage 10 including an interlocking screen 11 attached to a metallic frame 12. Centered between side posts 13 of the frame 12 is breeding box 15 of the present invention. The breeding box 15 is usually attached to the rear wall 11a of the screen 11 as via a pair of hooks 14. The positioning of the breeding box 15 relative to the flight cage 10 is such that passageways 16 and 17 of the breeding box 15 are aligned with openings 14a and 14b cut in the screen 11. In that way, a male and female bird such as cockatoos 20 and 21, respectively, (shown in phantom line) can enter and exit the box 15 via the aligned passageways 16, 17 and thence through the openings 14a and 14b cut in the screen 11 of the flight cage 10. The screen 11 is formed of rigid and thick enough wire to withstand the pressure of the ultra strong beaks of both the male 20 and female 21. For the same reason, the breeding box 15 is constructed of galvanized sheet metal say 1/32 in thickness in the manner thereinafter described.

In operation, the male 20 is most likely to explore the breeding box 15 first. After a time of encouragement, the female 21 will eventually settle in within a nesting arm 30 of Tee-shaped central section 32. The nesting arm 30 is seen to be positioned below a pair of parallel arms 33 formed of a series of wall panels described in detail below, one of which being penetrated by passageways 16, 17 previously described. The male 20 will continue to go in and out of the box 15 to the flight cage 10 via the passageways 16, 17, while simultaneously feeding and courting the female 21. Once the female 21 starts to lay eggs, maintaining a peaceful environment within the breeding box 15 is essential. Quarrels can and do constantly occur. But as long as in these circumstances, the female 21 has the option of escaping from the nesting arm 30 back to the flight cage 10; irrespective of which passageway 16, 17 is first used by the male 20, destructive behavior is avoided.

In accordance with the invention, a tee-shaped baffle 40 is attached to the parallel arms 33 of the Tee-shaped central segment 32 and includes a vertical segment 41 and a horizontal segment 42. As explained in more detail below, the purpose of the Tee-shaped baffle 40 is as follows. It limits direct passage of the male 20 from one of the parallel arms 33 to the other (bypassing the nesting arm 30), as when the female 21 is escaping from the nest arm 30. It does this by the fact that the vertical segment 41 forms a solid wall between the parallel arms 33. While at the same time, the horizontal segment 42 limits passage height for the male 20 relative to the nesting arm 30.

Eggs are laid until a clutch of four to seven eggs occurs. These eggs are inspected daily via a separate gated passageway 39 of the Tee-shaped central section 32. As shown, the passageway 39 is positioned adjacent to the nesting arm 30, such inspection occurring after a series of knocks encourages the female 21 to leave the nest and go into the flight cage 10. Since the eggs must be turned each day (or the embryos will die), the calmer the environment about the nesting arm 30, the more likely the breeding cycle will successfully concluded. Incubation can start a few days after the eggs are laid. Usually the female 21 will start to sit by the time there are two or three eggs. If she is reluctant, the male 20 will actually chase her into the nesting arm 30. Many times, the parents will share sitting. The male 20 will sit during the day and the female 21 at night with the male 20 standing guard at one of the passageways 16, 17 using a portion of the parallel arms 33 as a support, as explained below. Since in these circumstances, the female 21 has the option of escaping from the nesting arm 30 irrespective of direction of entry of the male 20 into arm 30, destructive behavior leading to broken eggs is avoided. The incubation period is usually less than a month. Normally an egg will hatch every other day in the order they were laid. The emerging chicks are initially housed within the nesting arm 30 and are fed by both parents.

FIGS. 2, 3, 4, 5 and 7 illustrate the Tee-shaped central section 32 and tee-shaped baffle 40 in still more detail.

As shown, the Tee-shaped central section 32 has the parallel arms 33 defining a substantially horizontal axis of symmetry A. The axis of symmetry A extends along both of the parallel arms 33 intersecting a central junction 35. Disposed about the junction 35 is a series of walls of the parallel arms 33 that includes the following: a top wall 34a, a series of side walls 34b and end walls 34c. Axis of symmetry B of the nesting arm 30 also intersects the junction 35. That is, the nesting arm 30 is normal to the parallel arms 33 wherein axes of symmetry A, B intersects each other at junction 35. The nesting arm 30 is seen to be formed of bottom wall 36a and a series of side walls 36b. Note that the vertical upright side walls 34c of the parallel arms 33 and the exterior upright side walls 36b of the nesting arm 30 are integrally formed using a pair of front and rear Tee-shaped wall panels 37a, 37b in the manner described below in association with the method aspects of the present invention.

The tee-shaped baffle 40 includes vertical segment 41 and horizontal segment 42. The vertical segment 41 defines a vertical plane coincident with axis of symmetry B of the nesting arm 30. The Tee-shaped baffle 40 limits direct passage of the captive birds from one of the parallel arms 33 to the other wherein the birds could bypass the nesting arm 30 by jumping across mouth 31 of the latter. It does this by the fact that the vertical segment 41 forms a solid wall between the arms 33 that is defined by a vertical plane coincident with the axis of symmetry B. Such a vertical plane also bisects the nesting arm 30. While at the same time, the horizontal segment 42 limits passage height for the birds to a value h, see FIG. 5, that only permits the birds to crawl along the arms 33 in the vicinity of the mouth 31 of the nesting arm 30 and does not allow them enough space to jump across the mouth 31. Hence to traverse the parallel arms 33, the male must crawl down into the nesting arm 30 with his head exposed via one of the ladders 38 attached to the nesting and parallel arms 30, 33, see FIG. 5. In addition, the length of the horizontal segment 42 is such as to form a pair of complementary overhang portions 43, see FIG. 3. These overhang portions 43 provide limited crawl space 44, see FIG. 5, for the purposes previously mentioned. An additional bonus of such overhang portions 43 is that they also reduce the speed that the male can traverse the parallel arms 33. However, each complementary portion 43 still leaves sufficient floor space in the vicinity of passageways 16, 17 so as to form a pair of surveillance anteroom regions 45, see FIG. 3, for the male. Note that the male, when on guard duty, uses a horizontal side wall 34b of the parallel arms 33 (in the region 45) as a floor to observe and maintain surveillance of the both the nesting arm 30 via the crawl space 44 and the flight cage 10 via passageway 16 or 17. Each of the anteroom regions 45 is positioned above and offset from said nesting arm 30. In a typical construction, h is about 5¼ inches; each overhang portion 43 is about 3¼ inches; and the total length of the horizontal segment 42 is about 18 inches. The length of each anteroom region 45 spanning each overhang portion 43 to the side walls 36b is about 9 inches.

MODIFICATION

Figure 8:
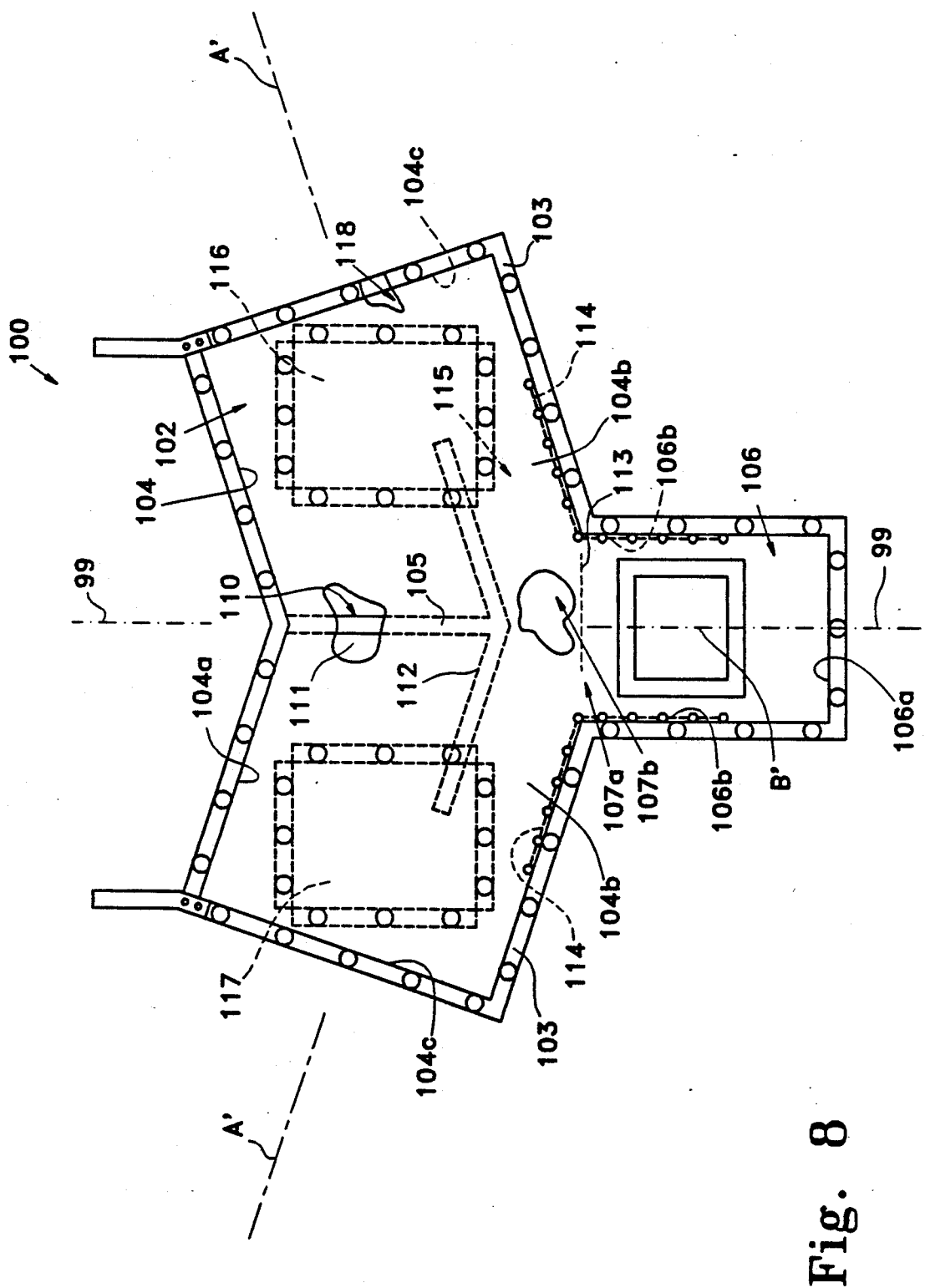
FIG. 8 is side elevational view of another embodiment—partially cutaway—of the breeding box of the invention.

FIG. 8 shows a Y-shaped breeding box 100 in accordance with the present invention.

As shown, Y-shaped central section 102 has an offset pair of arms 103 that are slanted relative to working plane 99. The arms 103 define substantially, non-parallel axes of symmetry A'. The axes meet at working plane 99 defining an imaginary central junction point 105. Disposed about the junction 105 is a series of walls of the arms 103 that includes the following: top walls 104a, a series of side walls 104b and end walls 104c. Axis of symmetry B' of the nesting arm 106 also intersects the junction 105. Thus, the axes of symmetry A' of the off-set arms 103 and axis B' intersect each other at junction 105. The nesting arm 106 is seen to be formed with bottom wall 106a and a series of side walls 106b. Note that the slanted side walls 104b of the pair of arms 103 and the exterior upright side walls 106b of the nesting arm 106 are integrally formed using a pair of front and rear Y-shaped wall panels 107a, 107b in the manner described below in association with the method aspects of the present invention.

The baffle 110 includes vertical segment 111 and non-parallel segments 112. The vertical segment 111 is coincident with the vertical plane 99 as well as with axis of symmetry B' of the nesting arm 106. The baffle 110 limits direct passage of the captive birds from one of the slanted arms 103 to the other wherein the birds could bypass the nesting arm 106 by jumping across mouth 113 of the latter. It does this by the fact that the vertical segment 111 of the baffle 110 forms a solid wall between the slanted arms 103. Such vertical segment 111 is along vertical working plane 99 as well as also bisects the nesting arm 106. While at the same time, the non-parallel segments 112 limit passage height for the birds to a low value that only permits the birds to crawl along the arms 103 in the vicinity of the mouth 113 of the nesting arm 106 and does not allow them enough space to jump across the mouth 113. Hence to traverse the oppositely-slanting arms 103, the male must crawl down into the nesting arm 103 with his head exposed via one of ladders 114 attached to the nesting and slant arms 106, 103. In addition, the length of the non-parallel segments 112 is such as to form a pair of complementary overhang portions 115. These overhang portions 115 limit the crawl space for the purposes previously mentioned. An additional bonus of such overhang portions 115 is that they also reduces the speed that the male can traverse the arms 103. However, each complementary portion 115 still leaves sufficient floor space in the vicinity of passageways 116, 117 so as form a pair of surveillance anteroom regions 118 for the male in the manner previously mentioned viz., to observe and maintain surveillance of the both the nesting arm 106 and the flight cage adjacent to the box 100. Each of the anteroom regions 118 is positioned above and offset from said nesting arm 106.

METHOD OF ASSEMBLY

FIGS. 6, 7, 9, 10 and 11 illustrate the construction and assembly of the breeding box of the invention. Before describing the assembly steps in detail, however, a brief overview of the process is in order and is given below. Also note that while the breeding boxes 15, 100 of the present invention are carried by the method of the invention, description hereinafter concentrates by example on the construction of breeding box 15 (FIGS. 1–7). In this regard, the box 15 is constructed of sheet metal and is designed to have unitary panels of complementary mating shapes wherein all mating panels comprising each box are either straight edged (male) at their termini or are edged folded (female) in an L- or U- shape. Thus, the term "complementary" also describes the positional relationship of the mated male and female unitary panels, viz., at 90 degrees to each other after assembly. Such complementary design further permits assembly off-site wherein the male and female unitary panels can be to stacked in separate subassemblies 120, 124 127 (FIGS. 9-11), shipped and then assembled at the off-site location. In addition, a series of vee-shaped stays 48 (FIG. 11) used in conjunction with the touching male and female panels further stabilizes attachment, as described below.

OVERVIEW OF THE METHOD OF THE INVENTION

Figure 9:
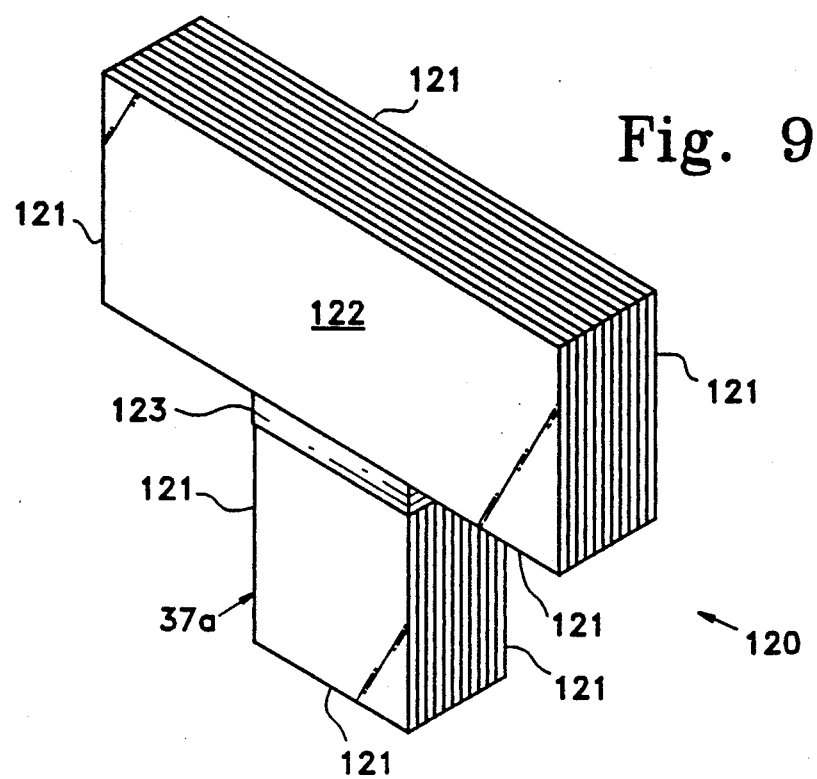
FIGS. 9, 10 and 11 are perspective views, respectively, of subassemblies of male panels, female panels and clamping stays used to assemble the breeding boxes of the invention, off-site.
Figure 10:
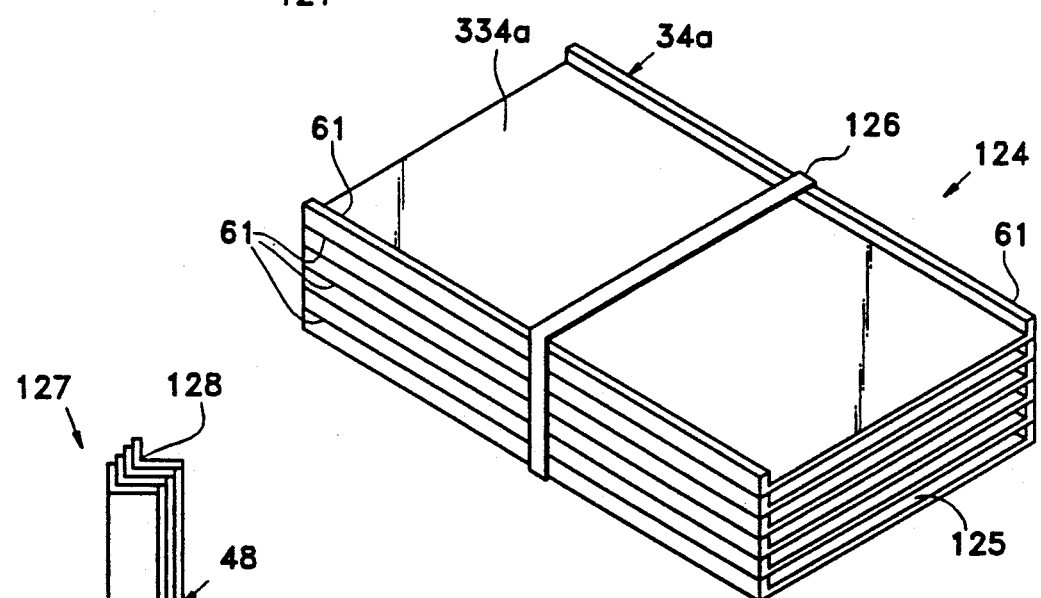
Figure 11:

FIGS. 9, 10 and 11 show how the unitary male and female panels can be stacked as separate subassemblies 120, 124, 127, respectively.

In FIG. 9, an example of a series of male panels is shown as first subassembly 120. The subassembly 120, as shown, includes a series of Tee-shaped front panels 37a previously mentioned ready for shipping. As shown, such Tee-shaped panels 37a are straight edged at their termini 121, (i.e., flat over their entire broad surfaces 122) and then are stacked such that such broad surfaces 122 are in surface contact. A binding 123 keeps the assemblage unitary. In similar fashion in FIG. 10, an example of a series of female panels is shown as second subassembly 124. Such panels function as the top wall panel 34a' of the finished breeding box 15 of FIGS. 1-7 also previously described. As shown such top wall panels 334a are folded at the termini 61 and stack in broad surface contact for shipment. A binding 126 keeps the assemblage unitary. In addition in FIG. 11, a series of vee-shaped clamping stays 48 is shown and are denoted as subassembly 127. As shown such clamping stays 48 are Vee-shaped and can be stacked within stacked valleys 128. A binding 129 keeps the assemblage unitary. The purpose of the clamping stays 48: they are used in conjunction with securing the male and female panels to further stabilize their attachment, as described below.

The method of the invention also includes the steps of:

(1) prior to packaging, shipment and assembly at the off-site location, the fabricator sorts and packages the designed unitary female edged panels, the male edged panels and clamping stays 48, into separate, stacked subassemblies as examplified by the subassemblies 120, 124, 127 of FIGS. 9, 10 and 11 wherein bulk of the total package to be shipped, is minimum;

(2) the fabricator then ships such packaged subassemblies, such as the subassemblies 120, 124, 127 to the off-site location, for assembly;

(4) at the off-set location, the receiver unbuttons the subassemblies and then assembles the male and female panels using the vee-shaped clamping stays 48 into a series of breeding boxes.

In regard to step (4), the design and shape of the unitary male edged panels examplified in subassembly 120 (FIG. 9), the unitary female edged panels examplified in subassembly 125 (FIG. 10) and the vee-shaped clamping stays 48 (FIG. 11), aid greatly the assembly of the breeding boxes at the off-site location. In more detail, the assembly steps at such location can include the following:

(i) after unbutting the male and female panels examplified by subassemblies 120, 125 (FIGS. 9, 10) as well as the vee-shaped clamping stays 48 (FIG. 11), the receiver complementarily manipulates selected female and male panels into attaching positions in which the female and male panels mechanically touch;

(ii) then the receiver slides one of the clamping stays 48 about the touching female and male panels ala a sandwich, and finally, deforms the touching region of the female and male panels and clamping stay 48 using a hand-held tool, such as a hand-held crimping pliers whereby a permanent bonding occurs therebetween.

In a preferred assembly method, the receiver starts with a straight edged panel such a Tee-shaped front wall panel 37a of FIG. 6; then he manipulates such panel relative to a complementary positioned female edged panel (which can be a top wall panel 34a'), viz., into touching contact with the former. Then a clamping stay 48 is attached and deformed. Thereafter, the steps are repeated using other straight end edges of the Tee-shaped front wall 37a with other complementary positioned female panels so as to build a major portion of the exterior walls of the box in sequential fashion.

However, before closure of each box occurs, the interior baffle 40 (FIG. 6) as previously described, is attached at the interior of the construction, viz., at the junction point 35 FIGS. 2-4) of the pair of arms 33 and the nesting arm 30. That is, in this aspect of the method, the receiver must insert the baffle 40 at the junction point 35, and then permanently attaches the same before the breeding box 15 becomes a completely closed structure. Attachment is by way of sheet metal screws 81, 82 (FIG. 6) extending through openings in both the latter and in folded edges of the baffle 40. Thereafter he provides final closure of the breeding box 15 in the manner previously described.

DETAILED DESCRIPTION OF THE METHOD

Now having provided an overview of the method of the invention, reference is now made to FIG. 6 for further details.

Note that the male panels comprising the box 15 are provided with correct edges to mate with corresponding female panels as mentioned above. In this regard, note only the front and rear wall panels 37a, 37b are provided with straight (male) edges 121. The remainder of the panels as shown in FIG. 6 are formed with folded (female) edges 61.

Next, groups or sets of complementary positioned panels are manipulated into edged alignment usually starting from the top and proceeding down to receive in sequence a plurality of Vee-shaped cover stays 48. Each stay 48 includes sides 90 originating from a vee center 91. With a stay 48 placed about a particular edged alignment of the panels, the result is a sandwich 92, see FIG. 7, that includes outer sides 90 of the stay 48 forming the outer panels of the sandwich 92, a single ply edge of one of the coupled panels and a single ply edge of another of the panels as the encased material. Then the sandwich 92 is crimped at spaced locations along each of the stays 48 using a crimping pliers such as manufactured by Malco Products, Annadale, Minn., Model SL-1, in which the tips of the pliers are provided with a conical cavity and a smaller cylindrical plug. The result of sequential closure of the crimping pliers is a series of button crimps 95 along the edges of the breeding box 15, as shown in FIGS. 1-5. The characteristics of each button crimp 95 are in most part determined by its method of formation as shown in detail in FIG. 7. Opposed sides 90 of each Vee stay 48 is initially contacted by the plug and cavity segments of the pliers. Then with movement of the pliers, the plug is driven into surface contact with one of the sides 90 of the stay 48, thence in contact with either of the single ply encased edges and thence in the other edge of the aligned panel. The remaining side 90 of the Vee stay 48 is moved into contact with the cavity of the pliers. As a result, an interior, concave bubble 96 is formed where the plug of the pliers made contact and an outwardly directed a concave cap 97 is constructed where the cavity segment of the pliers rested.

In order to better understand the characteristics of the assembly, a detail examination of each of the male and female panels of the breeding box 15 is in order and is presented now in association with FIGS. 1-7.

FRONT AND REAR WALL PANELS 37a, 37b

FIG. 6 illustrates in more detail front and rear Tee-shaped front and rear wall panels 37a, 37b having straight (male) edges 121. As shown, each wall panel 37a, 37b is Tee-shaped in plan view. When assembled, they form upright vertical side walls 34b of the parallel arms 33 and exterior upright side walls 36b of the nesting arm 30 of FIGS. 1-5. The rear wall panel 37b includes the gated passageway 39 that includes a pair of U-shaped channels 53 attached to opposite sides of the passageway 39, and a planar gate member 54 with upturned edges 55, the gate member 54 being slidable within the channels 53. The front wall panel 37a includes the passageways 16, 17 previously mentioned, the latter being edged with U-shaped trim members 57 to prevent injury, see FIG. 2.

TOP WALL PANEL 34a'

Top wall panel 34a' of the breeding box 15 is seen to be rectangularly shaped in plan view and is provided with outwardly directed single ply (female) edges 61 along opposite longer sides. When assembled, the top wall panel 34a' forms the top wall 34a of the parallel arms 33 of FIGS. 1-5.

END WALL PANELS 34c'

In the construction of the breeding box 15, a pair of end wall panels 34c' are used, but since they are identical only one need be described in detail. As shown, the end wall panel 34c' is seen to be rectangularly shaped in plan view. It also includes outwardly directed single ply (female) edges 65 along both its long and short sides. When assembled, the end wall panels 34c' form the end walls 34c of the parallel arm 33 of FIGS. 1-5.

UPRIGHT L-SHAPED PANELS 67

In the construction of the breeding box 15, a pair of L-shaped panels 67 are used, but since they are identical only one need be described in detail. As shown, the L-shaped panel 67 is seen to be provided with outwardly directed single ply (female) edges 68 along opposite sides. When assembled, the pair of L-shaped panels 67 form the horizontal flat side walls 34b of the parallel arms 33 and the interior upright side walls 36b of the nesting arm 30, respectively of FIGS. 1-5. Note also that horizontal segment of each L-shaped panel 67 also forms the floor of the anteroom region 45 to which the L-shaped ladder 38 is attached, as by spot-welding.

BOTTOM WALL PANEL 36a'

In FIG. 6, bottom wall panel 36a' used in the construction of the box 15 is seen to be also rectangularly shaped in plan view and is provided with outwardly directed single ply folded (female) edges 76 along all of its sides. When assembled, the bottom wall panel 36' forms the bottom wall 36a of the nesting arm 30 of FIGS. 1-5.

INTERIOR BAFFLE 40

As indicated in FIG. 6, vertical segment 41 of the L-shaped baffle 40 is also seen to be rectangularly shaped in plan view and is provided with outwardly directed single ply folded (female) edges 78 along opposite sides 79 having two series of openings 80 through which two sets of pop rivets 81, 82 penetrate. The rivets 81 attach the vertical segment 41 to the top wall panel 34s; the set of rivets 82 attach the vertical segment 41 to the horizontal segment 42 of the baffle 40. When assembled, the vertical segment 41 forms the vertical solid wall between the parallel arms 33 of FIGS. 1-5.

As in FIG. 6, horizontal segment 42 of the L-shaped baffle 40 is also rectangularly shaped in plan view and is provided with outwardly directed single ply folded (female) edges 83 along opposite sides. The edges 83 also having a series of openings 84 through which rivets 85 can penetrate to fix the horizontal segment 42 relative to the front and back wall panels 37a, 37b. When assembled, the horizontal segment 42 forms the overhang regions 44 between the parallel arms 33 and nesting arm 30 of FIGS. 1-5.

It is understood that various modifications and substitutions may be made in connection with the invention as described herein by those skilled in the art without departing from the spirit and scope of the following claims.

What is claimed is:

1. A breeding box for use with a bird cage to aid breeding of strong beaked birds wherein male bird aggression is temporized, comprising:
   (i) a central section having a pair of arms each defining a non-parallel axis of symmetry with the other and a common junction point therebetween through which each said non-parallel axis of symmetry extends, a nesting arm attached to said pair of arms having an axis of symmetry also intersecting said common junction point, each of said pair of arms including a normally open external passageway to permit external entry and egress of birds relative to said central section,
   (ii) a baffle positioned adjacent to said junction point of said pair of arms and said nesting arm, in attaching contact with said central section whereby direct passage between said pair of arms bypassing said nesting arm is prevented, and wherein a sitting female within said nesting arm is provided with an escape option whereby male aggression can be temporized without disruption of the breeding cycle.

2. The box of claim 1 in which said baffle is positioned at said junction point of said pair of arm and said nesting arm and includes a transverse element forming a solid wall between said pair of arms and cross element means attached to said transverse element and positioned across said nesting arm whereby passage height within said pair of arms is limited to a value h that only permits a bird to crawl into said nesting arm with his head exposed.

3. The box of claim 2 in which said cross element means of said baffle includes first and second support segments extending into said pair of arms to each define an overhang portion parallel to said axis of symmetry of said pair of arms, said overhang portion defining a passage length L therein that together with said passage height h limits speedy travel between said pair of arms and said nesting arm by said bird.

4. The box of claim 1 in which said central section is Y-shaped and wherein pair of arms are slanted relative to each other.

5. The box of claim 4 with the addition of ladder means attached to said pair of arms and said nesting arm to facilitate entry and egress of birds relative thereto.

6. The box of claim 4 in which said baffle includes a transverse element forming a solid wall between said pair of arms and a slanted transverse element attached to said transverse element and positioned across said nesting arm and extending along a segment of each of said pair of arms whereby passage height within said pair of arms is limited thereby causing said birds crawling into said nesting arm to have their heads exposed.

7. The box of claim 1 in which said pair of arms define a pair of spaced apart anteroom regions, each of which being positioned offset from said nesting arm and including a normally open external passageway to permit external entry and egress relative to said central section and a conventional cage.

8. A method of packaging a series of panels comprising a series of breeding boxes for shipment to an off-site location and then assembling said panels into a series of breeding boxes at said off-site location, each of said series of breeding boxes aiding in breeding of strong beaked birds and temporizing male bird aggression and comprising: (i) a central section having a pair of arms each defining an axis of symmetry and a nesting arm extending from said pair of arms, said pair of arms and said nesting arm defining a junction point therebetween, each of said pair of arms including a normally open external passageway to permit external entry and egress of birds relative to said central section, and (ii) a baffle positioned adjacent to said junction point of said pair of arms and said nesting arm, in attaching contact with said central section whereby direct passage between said pair of arms bypassing said nesting arm is prevented, and wherein a sitting female within said nesting arm is provided with an escape option whereby male aggression can be temporized without disruption of the breeding cycle, said method comprising the steps of:
(1) constructing mating panels comprising at least the majority of exterior walls of each box using mating folded female edged panels and straight male edged panels,
(2) manipulating the female and male panels into an attachment position in which the female and male panels mechanically touch,
(3) sliding a clamping stay about the touching female and male panels, and
(4) deforming a touching region of the female and male panels and clamping stay whereby a permanent bonding occurs therebetween.

9. The method of claim 8 in which step (1) includes the substeps of:
(i) packaging the straight edged male panels, the folded female panels and clamping stays separately in a series of stacked, low-cost shipping subassemblies and
(ii) shipping such subassemblies to an off-site location for assembly.

10. The method of claim 8 in which step (2) includes the substeps of:
(i') starting with a straight edged male panel forming a Tee or Y-shaped rear or front panel of the assembled breeding box, manipulating a folded female edged panel into touching contact with one of the straight edge segments of the Tee or Y-shaped rear or front panel then
(ii') after carrying out steps (3) and (4), repeating substep (i') using other straight edge segments of the Tee or Y-shaped rear or front panel so as to build a major portion of the exterior walls comprising the central section of the box.

11. The method of claim 10 includes the substep of: inserting a baffle at the interior of the major portion of the exterior walls, and attaching same using coupling means extending through said major portion into contact with folded edges of the baffle.

12. The method of claim 11 in which said coupling means includes sheet metal screws penetrating a plurality of openings.

13. The method of claim 12 including a final substep of completing the closure of all exterior walls comprising the central section of the box.

14. The method claim 11 in which said baffle is positioned at the central junction of the pair of arms and the nesting arm.

15. The method of claim 14 including the precursor substep of forming the baffle into a Tee shape by attaching a first transverse element having folded edges in attachment with the broad surface of a second cross element using coupling means, said first and second elements also having other folded edges for attachment to the exterior walls comprising the central section of the box.

16. The method of claim 8 in which step (3) includes sliding a Vee-shaped clamping stay about the touching female and male panels in sandwich style.

17. The method of claim 8 in which step (4) includes using a crimping tool to deform the touching region of the female and male panels and clamping stay wherein the tool is advanced in sequence along the full length of the touching female and male panels and clamping stay to form a series of deformed regions therealong.

* * * * *